Oct. 31, 1961 L. W. ERATH ET AL 3,007,010

COMPENSATION FOR DISTORTION IN MAGNETIC RECORDING

Filed Nov. 1, 1957 2 Sheets-Sheet 1

INVENTORS
Louis W. Erath
and Louis B. McManis
BY
Burns, Doane, Benedict & Irons
ATTORNEYS

COMPENSATION FOR DISTORTION IN MAGNETIC RECORDING

Filed Nov. 1, 1957 2 Sheets-Sheet 2

INVENTORS
Louis W. Erath
and Louis B. McManis

BY
Burns, Doane, Benedict & Irons
ATTORNEYS 3,007,010
Patented Oct. 31, 1961

3,007,010

COMPENSATION FOR DISTORTION IN MAGNETIC RECORDING

Louis W. Erath and Louis B. McManis, Houston, Tex., assignors, by mesne assignments, to Dresser Industries, Inc., Dallas, Tex., a corporation of Delaware Filed Nov. 1, 1957, Ser. No. 693,909
7 Claims. (Cl. 179—100.2)

This invention relates to magnetic recording, and more particularly to a direct magnetic recording method and apparatus free from certain disadvantages of prior direct recording systems.

Direct recording on magnetic record media has previously been employed, but it has not been wholly successful because of such effects as poor amplitude response, modulation noise, and high distortion. In order to avoid these effects, the frequency modulation method was adopted and is used very widely for magnetic recording. While frequency modulation is quite superior to direct recording, as that method has been known in the past, frequency modulation also has certain undesirable features. One such feature which is quite important in seismic recording particularly, is noise generated in the recording apparatus and recorded with the signal, as a result of small variations in the speed of movement of the magnetic tape.

The present invention is designed to compensate for the distortion normally inherent in direct recording, so that direct recording can be used satisfactorily, particularly in seismic work. It is known that the distortion of an electrical signal in direct recording is principally caused by the remanent magnetism characteristics of the recording tape. This distortion is relatively constant and is therefore predictable. The invention of the present application resides in compensation for that distortion by distorting the electrical signal before it is recorded on the magnetic medium, or by distorting the signal played back from the medium after recording, this distortion being in opposite sense to that caused by the characteristics of the magnetic record medium. With the distortion of the magnetic tape compensated in such manner, the signal played back from the tape will have minimal distortion.

As indicated, the compensating distortion can be effected during recording or during playback of the magnetic record.

The method and apparatus of the invention will now be more fully described in conjunction with preferred embodiments thereof shown in the accompanying drawings.

Figure 1:
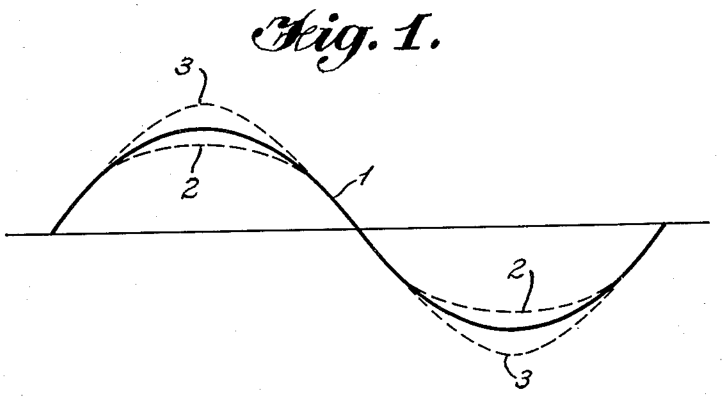
FIG. 1 is a representation of a sine wave signal, together with an illustration of the distorting effects on that signal of a magnetic record medium, and the distortion that might be added to compensate therefor.

In FIG. 1 a pure sine wave 1 to be recorded on a magnetic record medium, such as a magnetic tape, is shown. The magnetic tape characteristics will cause distortion of the signal such that it will follow the outline shown in dotted line form at 2. In order to compensate for the distortion inherent in this change in waveform of the signal, the method of the present invention involves compensating distortion of the signal 1 such that it follows the wave form shown in dotted line form at 3. If the distortion is inserted in the recording channel, the waveform 3 will actually be fed to the recording apparatus and the distortion caused by the characteristics of the magnetic tape will result in the original signal wave shape 1 being obtained from the magnetic tape. On the other hand, if the signal 1 is fed to the recording apparatus and the distortion inserted in the playback channel, the wave shape 1 will also be available from the playback apparatus.

Figure 2:
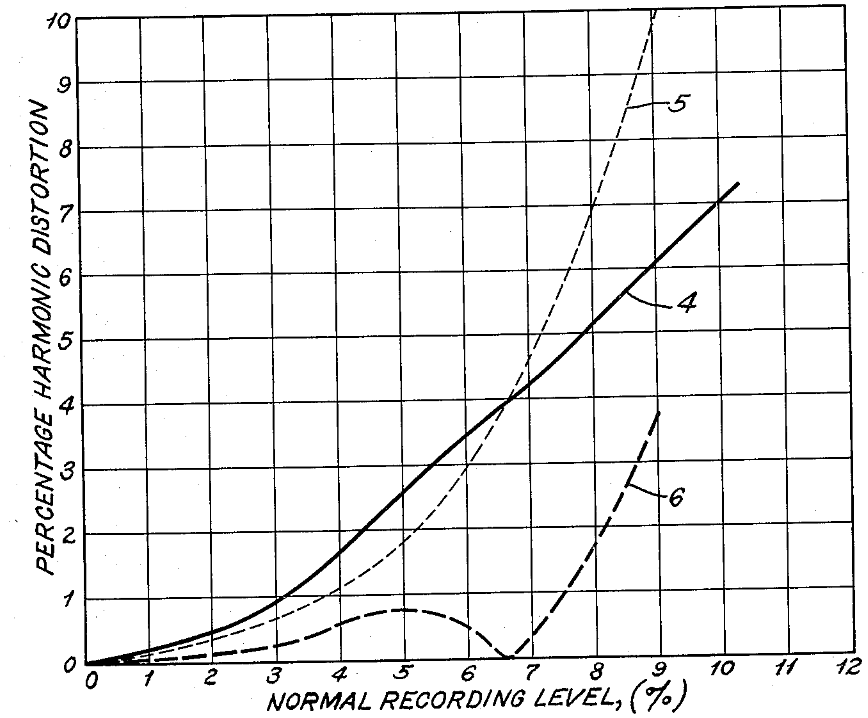
FIG. 2 is a graph of the distortion versus the recording level of a typical magnetic record medium.

The graph of FIG. 2 represents the variation in percentage of harmonic distortion with the recording level of the signal. The curve 4 of FIG. 2 is a typical magnetic tape characteristic and shows that the distortion increases very slowly with increasing recording level for a substantial portion of the curve's extent and then increases relatively rapidly with increasing recording level.

The purpose of the present invention is to introduce a correction in the recording or playback channel for this increasing distortion, so that a higher recording level is possible, yet with approximately the same or lower percentage of harmonic distortion as found in the lower recording leveles shown in curve 4. Thereby, the signal to noise ratio at higher recording levels will be increased over that normally found with magnetic recording tape. In order to effect this correction, a correcting network having a characteristic represented by curve 5 of FIG. 2 is employed. The distortion introduced by this correcting network is opposite in sense to the normal distortion of curve 4, so that the two distortions are substractive, and the characteristic of the recording or playback network, including the distortion network, is represented by curve 6 of FIG. 2. It will be evident from the characteristics of curve 6 that it is possible to operate at a relatively high recording level, with relatively small harmonic distortion, due to the characteristics of this invention.

Figures 3, 4:
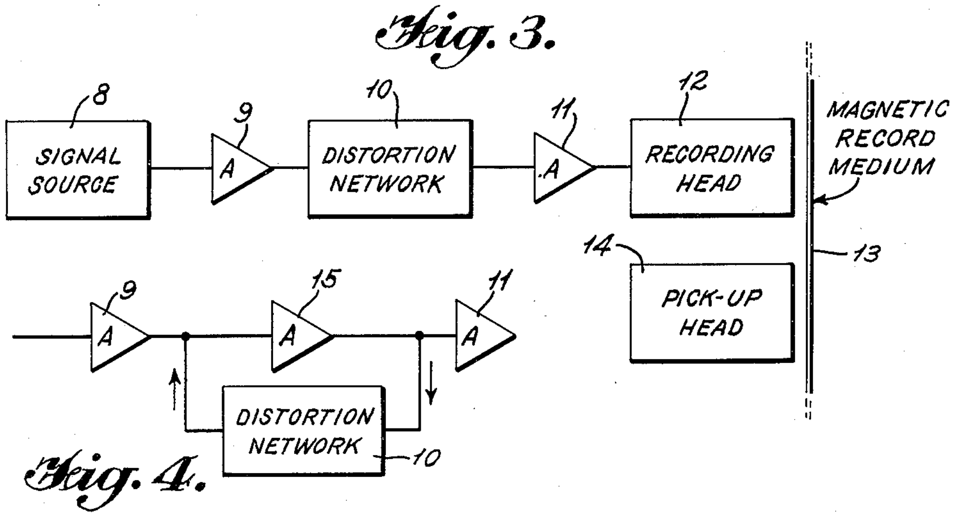
FIG. 3 is a block diagram illustration of a method and apparatus of the invention.
FIG. 4 is a block diagram showing apparatus alternative to that of FIG. 3.

The apparatus shown in FIG. 3 accomplishes compensation of the distoring characteristics of the magnetic tape by distorting the electrical signal to be recorded in the recording channel. A source of a signal to be recorded is shown at 8 and is amplified in a suitable amplifier 9. The output of amplifier 9 is furnished to a distortion network 10, and the output of the network is amplified in an amplifier 11 before being fed to a magnetic recording head 12. The recording head is of conventional characteristics and is positioned closely adjacent a magnetic record medium 13, such as a magnetic tape. The tape is advanced past the recording head and past a pickup head 14, as is conventional in most magnetic recording systems.

The distortion network of FIG. 3 distorts the electrical signal in the recording channel prior to recording in such fashion as to compensate for the distortion caused by the characteristics of the magnetic tape.

If desired, the compensating distortion could be performed in the pickup or playback channel, rather than in the recording channel.

Also, the compensating distortion could be inserted through use of a feedback network arrangement such as shown in FIG. 4, where amplifier 9 feeds an amplified signal to amplifier 15, which in turn feeds its output to amplifier 11, all in the recording channel. A feedback network including the distortion network 10 is connected around amplifier 15 so as to distort the signal to be recorded in compensating fashion. Obviously the sense of distortion must be opposite in the feedback arrangement of FIG. 4 from that employed in the direct system of FIG. 3.

The apparatus of the present invention includes a particular distortion network which has been found to have characteristics opposite to those of a magnetic recording medium. This distortion network is shown in FIGS. 5 and 6.

Figures 5, 6:
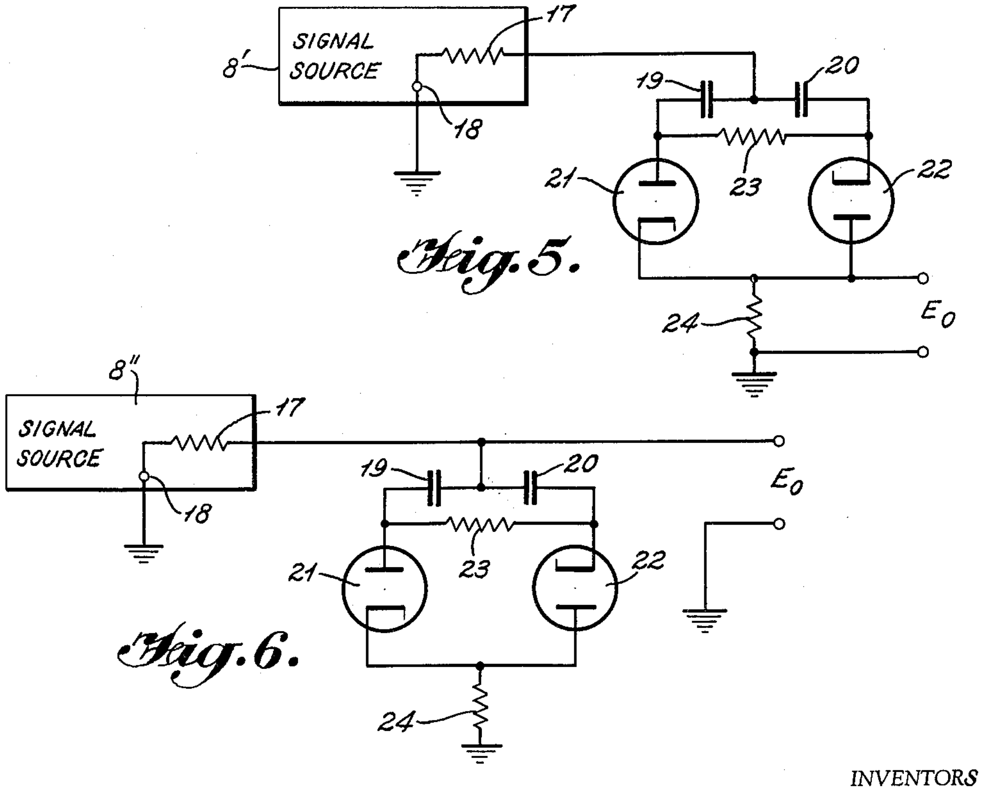
FIG. 5 is a schematic diagram of a distortion network operable with the present invention; and, FIG. 6 is a modification of the circuit of FIG. 5.

Referring to FIG. 5, the signal source 8', which may be amplifier 9 of FIG. 3 includes a resistor 17 and a source of signal voltage 18. Series resistor 17 is connected to the junction between a pair of capacitors 19 and 20 and the other sides of the capacitors are respectively connected to the plate and the cathode of vacuum tube diodes 21 and 22. The plate of diode 21 is connected to the cathode of diode 22 by resistor 23. The cathode of diode 21 is connected directly to the plate of diode 22, and the junction point is connected to ground through a resistor 24. The output of the distortion network is available across resistor 24 and may be connected to amplifier 11 of FIG. 3.

The characteristics of the distortion network illustrated are such that the diodes operate in the electron initial velocity portion of their characteristics. The effects of such operation are discussed in McManis Patent No. 2,663,002, issued December 15, 1953, which patent discloses a gain expander for a seismic recording apparatus employing an attenuator including diodes like the distortion network of this invention. As explained in the McManis patent, the resistance of a diode in the electron initial velocity region of its characteristics is determined substantially only by the current through the diode and the temperature thereof. Since the temperature is maintained relatively constant, the resistances of the diodes of the apparatus of FIG. 5 depends substantially only on the current therethrough and varies non-linearly with respect to that current. The magnitude of resistance 23 determines the static operating point on the characteristics of the diodes at which the distortion network operates, since that resistance determines the amplitude of current that flows in the system when no voltage is applied thereto. It is desirable that the resistance be very high and that it preferably be of the order of 10 megohms. It has been found that the diodes themselves exhibit dynamic resistances of the order of 2 megohms, in a circuit such as shown in FIG. 5.

Capacitors 19 and 20 are provided to limit the direct current through the diodes to that traversing the path including resistor 23.

The magnitude of resistance of resistor 24 also determines the attenuation of the signal voltage by the distortion network. In order that the distortion effect of the diodes may be relatively large, resistor 24 is preferably small in comparison with the dynamic resistances of the diodes. The resistor is preferably of the order of between 100,000 and 200,000 ohms.

It will be evident that the higher the total of the resistances of resistor 17 and resistor 24, the lower will be the distortion effects of the diode network. Therefore, the distortion level can be adjusted by varying the total of these two resistances. Also, since the resistance of resistor 23 determines the static operating point of the diodes, the distortion effect of the diodes can be adjusted by changing its resistance.

The distortion network of FIG. 5 may be connected in series between the signal source and the recording head, or between amplifiers. It is also possible that it would be desired to connect the distortion network in parallel in the recording channel. The apparatus of FIG. 6 shows the same circuitry as illustrated in FIG. 5, but with the output of the distortion network being available across the entire network. In this figure, the junction between resistor 17 and the capacitors 19 and 20 is connected to the ungrounded side of the recording channel. The signal source 8'' may be the output of amplifier 15 of FIG. 4, while the output is connected to the input of the amplifier.

As indicated above, the distortion network of FIGS. 5 and 6 may be connected in the playback channel of the recorder, as well as in the recording channel.

The distortion network connection of FIG. 5 is used in circuits such as that shown in FIG. 3 and furnishes a current-through-the-diodes response which is opposite to the distortion effects of the magnetic record medium. The distortion network of FIG. 6 furnishes a voltage-across-the-diodes response opposite to that of the distortion network of FIG. 5 and is connected in a system such as that shown in FIG. 4, a feedback network. Obviously, if the distortion is to be introduced in feedback manner, it must be opposite from that used in series connection.

The specific distortion networks shown in FIGS. 5 and 6 are merely examples of networks that will yield distortion characteristics which will compensate for the distorting characteristics of a magnetic record medium. Other networks could be designed for the same purpose and it is to be understood that the invention is not limited to the particular distortion networks disclosed.

Though it has been indicated that distortion can be introduced into the playback channel, as well as the recording channel, it will generally be more satisfactory for distortion to be introduced into the recording channel, since the signal in the playback channel may vary greatly in amplitude from time to time. Since the amount of corrective distortion made varies with the magnitude of the signals extending above the knee of curve 4 of FIG. 2, it is difficult to effect very good correction when the amplitude of the signal varies widely.

The method and apparatus of the present invention have been described in conjunction with illustrations of preferred embodiments thereof. It will be evident that minor changes could be made in the embodiments disclosed without departure from the scope of the invention. Therefore, the invention is not to be considered limited to the particular embodiments disclosed, but rather only by the scope of the appended claims.

We claim:

1. A magnetic recording system including a magnetic recording medium having known waveform distortion characteristics, a magnetic recording head, a recording channel for connecting a signal source to the recording head, and means connected between the signal source and the recording head operable to distort the waveform of the signal in sense and in magnitude opposite to that caused by the characteristics of the recording medium so as to compensate therefor, said distorting means including a pair of vacuum tube diodes having the cathode of one diode connected to the plate of the other diode, a pair of capacitors connected in series between the plate of said one diode and the cathode of said other diode, and a resistor connected across the series-connected capacitors.

2. The apparatus of claim 1 in which said distorting means is a distortion network connected in series between the signal source and the recording head.

3. The apparatus of claim 1 in which said distorting means is a distortion network connected across the channel between the signal source and the recording head.

4. The apparatus of claim 1 in which said channel includes an amplifier and said distortion means is connected between the input and output of the amplifier in such manner as to feed back a distorted signal from the output of the amplifier to the input thereof.

5. A magnetic recording system including a magnetic recording medium having known waveform distortion characteristics, a magnetic recording head, a recording channel connected between a signal source and the recording head, and a waveform distortion network connected in the recording channel comprising a pair of vacuum tube diodes having the cathode of one diode connected to the plate of the other diode and the shunt combination of a resistor and a pair of series-connected capacitors connected between the plate of said one diode and the cathode of said other diode, said distortion network being operable to distort the waveform of the signal in sense and in magnitude opposite to that caused by the characteristics of the recording medium so as to compensate therefor.

6. The apparatus of claim 5 in which the signal source has a pair of terminals, one of the terminals being connected to the junction between said capacitors, said distortion network including a resistor connected between the other terminal of the signal source and the common connection of the cathode of said one diode and the plate of said other diode.

7. The apparatus of claim 6 in which the recording head is connected across said last-mentioned resistor.

References Cited in the file of this patent

UNITED STATES PATENTS

| | | |
|---|---|---|
| 2,649,506 | Gayford et al. | Aug. 18, 1953 |
| 2,697,756 | Bessire | Dec. 21, 1954 |

OTHER REFERENCES

Frayne et al.: Elements of Sound Recording, John Wiley and Sons Inc., New York 1949, page 519 relied on. (Copy available Div. 16.)

Begun: Magnetic Recording, Murray Hill Books Inc., New York, 1949, pages 123–133 relied on. (Copy available in Div. 16.)